No. 845,748. PATENTED MAR. 5, 1907.
J. W. BOSCHE.
FASTENING DEVICE.
APPLICATION FILED SEPT. 25, 1906.

Witnesses:

Inventor:
John W. Bosche,

UNITED STATES PATENT OFFICE.

JOHN W. BOSCHE, OF BUFFALO, NEW YORK, ASSIGNOR OF ONE-HALF TO IRVING F. CRAGIN, OF BUFFALO, NEW YORK.

FASTENING DEVICE.

No. 845,748.  Specification of Letters Patent.  Patented March 5, 1907.

Application filed September 25, 1906. Serial No. 336,116.

*To all whom it may concern:*

Be it known that I, JOHN W. BOSCHE, a citizen of the United States, residing at Buffalo, in the county of Erie and State of New York, have invented a certain new and useful Improvement in Fastening Devices, of which the following is a full, clear, concise, and exact description.

My invention relates to a fastening device for detachably securing two meeting ends together, and has for its object the provision of a simple means by which the parts may be readily connected and disconnected and when so connected are locked together firmly and securely against accidental displacement or separation.

My invention contemplates a fastening device made in two parts, one of which is provided with a flattened or laterally-extending head or hook adapted to be inserted in a slot or eye in a second flattened member and to be locked between two opposing parts of said second member.

My invention also further consists in certain novel details of construction of the eye member, which will be hereinafter more fully set forth.

My invention may be more readily understood by reference to the accompanying drawings, in which—

Figure 1:
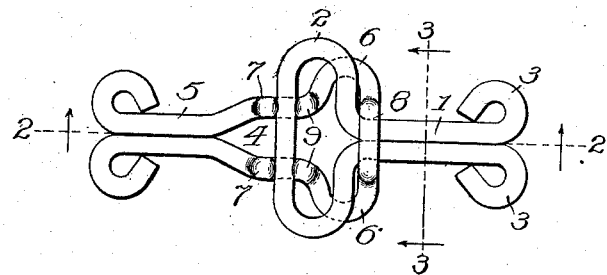
Figure 2:
Figure 3:
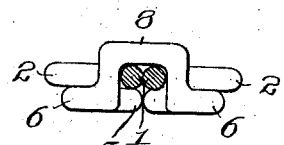
Figure 4:
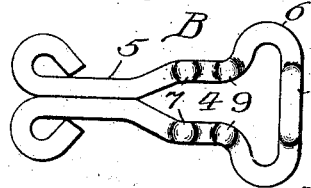
Figure 5:
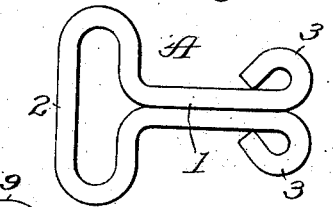
Figure 6:
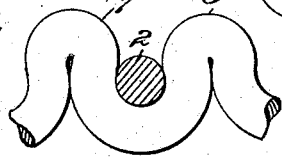

Figure 1 is a plan view of the two members locked together. Fig. 2 is a section on the line 2 2 of Fig. 1. Fig. 3 is a section on the line 3 3 of Fig. 1. Fig. 4 is a detail view of the eye member. Fig. 5 is a detail view of the hook member, and Fig. 6 is an enlarged fragmentary detail view showing the wire of one member locked between the resilient ribs on the other.

Like letters of reference refer to like parts wherever they are used.

The head or hook member A consists of a single integral piece comprising a shank 1, provided at one end with a loop or head 2 and at the other end with a part, of any suitable construction, for connecting it to the garment or other object to which it is to be attached, said part being shown in the drawings as consisting of the ordinary thread-eyes 3 3. I preferably make this member from a piece of wire with the middle portion bent to form the head or loop 2, the two ends being brought together in parallel relation to form the shank 1 and turned in opposite directions at their extreme ends to form the thread-eyes 3.

The eye or head-receiving member B consists of a single integral piece provided with an elongated slot or eye 4, of a length to permit the insertion therethrough of the head 2 of the member A when said members are held in a tilting relation to each other. The member B consists, therefore, of a shank 5, the eye-loop 6, and the usual attaching means, such as the thread-eyes illustrated.

The member B is provided on its upper surface with opposing spring clips or ribs 7 9, there being an opposing pair correspondingly located on opposite sides of the eye 4. Said ribs are formed by bending the wire up and then back down on itself. I form the top or head of the rib slightly rounded, the top or head thereby slightly overhanging the shank, so that there is formed between each pair of ribs or spring-clips, in effect, an undercut groove having a slightly restricted mouth. Owing to the resiliency of the wire of which said ribs are formed, the wire forming the front end of the loop 2 can be readily snapped into said groove and will be embraced by the clips with sufficient strength to securely lock it in place against accidental displacement, and yet it may be readily unfastened when desired.

The front portion 8 of the loop 6 is preferably bent upward sufficiently to form an inverted-U-shaped arch or channel for receiving the shank 1 of the hook member A. The elevation 8 thus permits the pull upon the members to be substantially in alinement. The head 2 is held securely between the rib 7 and the elevation 8, and, as before stated, additional security is also obtained by the positive engagement of the wire at the front of the loop 2 between the spring clips or ribs 7 9.

The eye member B is preferably formed of a single piece of wire bent in its middle portion to form the loop 6, having the eye 4 and its ends brought together to form the shank 5. The ribs 7 and 9 can be formed by crimping or otherwise bending the wire, as indicated in Fig. 2.

To connect the members A and B, the member A may be turned to lie in a plane substantially at right angles to the plane of the member B. It can then be readily inserted through the eye 4. It is then turned into position and drawn forward until the head 2 is in contact with the elevation 8, whereupon by pressing the head down it is snapped and locked in place.

The fastener of my invention may be formed of various sizes, or may otherwise be modified within the scope of the appended claims without departing from my invention to adapt it to any one of the many uses to which such a device may be put. It may be formed in small sizes to take the place of the ordinary hook and eye for fastening garments in position. In this form the fasteners possess the added advantage that owing to the flatness of their parts they are not liable to be crushed in the process of ironing the garment to which they are attached.

While the fastener of my invention is particularly adapted for use in connection with belts, suspenders, horse-blankets, garments of all kinds, &c., I do not wish to limit myself to any particular use or uses of the same, since it can obviously be used for a variety of different purposes.

Having described my invention, I claim—

1. In a fastening device, the combination with a hook member made of wire bent to form a shank and a loop or head, of an eye member made of wire bent to form a loop having an elongated eye through which said head is adapted to be inserted, and opposing spring-ribs forming between them a groove having a restricted mouth within which groove the wire of said head or loop is locked when said parts are in their fastened relation.

2. In a fastening device, the combination with a hook member made of a single piece of wire bent to form a shank and a loop or head, of an eye member made of a single piece of wire bent to form a loop having an elongated eye through which said head is adapted to be inserted, and a pair of opposing resilient ribs on each half of the eye member, said ribs having overhanging heads and each pair forming between them a groove with a restricted mouth within which the wire of said head or loop is adapted to be snapped and held securely locked.

3. In a fastening device, the combination with a hook member made of a single piece of wire bent to form a shank and a loop or head, of an eye member made of a single piece of wire bent to form a loop having an elongated eye through which said head is adapted to be inserted, a pair of opposing resilient ribs on the upper surface of each half of the eye member, said ribs having overhanging heads and each pair forming between them a groove with a restricted mouth opening upward, within which groove the wire of said head or loop is adapted to be snapped and held securely locked, and an arch at the front end of the loop, forming a channel for receiving the shank of the hook member.

In witness whereof I hereunto subscribe my name this 17th day of September, A. D. 1906.

JOHN W. BOSCHE.

Witnesses:
LEVANT D. LERBER,
JOHN S. HEIDER.